US007920212B2

(12) United States Patent
Uota

(10) Patent No.: US 7,920,212 B2

(45) Date of Patent: Apr. 5, 2011

(54) DIGITAL GAMMA CORRECTION CIRCUIT AND DIGITAL GAMMA CORRECTION METHOD

(75) Inventor: Toshihiro Uota, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1197 days.

(21) Appl. No.: 11/585,813

(22) Filed: Oct. 25, 2006

(65) Prior Publication Data

US 2007/0091021 A1 Apr. 26, 2007

(30) Foreign Application Priority Data

Oct. 26, 2005 (JP) ................................ P2005-310722

(51) Int. Cl.
*H04N 5/202* (2006.01)

(52) U.S. Cl. ........................................................ 348/674

(58) Field of Classification Search .................. 348/674, 348/675, 254–256, 671; 358/519; 382/167, 382/274; *H04N 5/202, 9/69*
See application file for complete search history.

(56) References Cited

U.S. PATENT DOCUMENTS

| | | | | |
|---|---|---|---|---|
| 5,243,426 | A * | 9/1993 | Murayama et al. | 348/674 |
| 6,278,496 | B1 | 8/2001 | Kitagawa et al. | |
| 7,477,303 | B2 * | 1/2009 | Tanji et al. | 348/254 |

FOREIGN PATENT DOCUMENTS

| | | | |
|---|---|---|---|
| JP | 8-51557 | A | 2/1996 |
| JP | 10-75384 | A | 3/1998 |
| JP | 11-32237 | A | 2/1999 |
| JP | 11-120344 | A | 4/1999 |

* cited by examiner

*Primary Examiner* — Sherrie Hsia

(74) *Attorney, Agent, or Firm* — Birch, Stewart, Kolasch & Birch, LLP

(57) ABSTRACT

A digital gamma correction circuit includes: a data setting portion for setting set data including a section width W1 and coordinates (Xp,Yp) of a break point P; a coefficient calculation portion for calculating coefficients for straight-line equations representing a broken baseline including a break point and three predetermined approximate line segments for defining a gamma correction broken line approximating an ideal gamma correction curve, the approximate line segments gradually varying in slope in the vicinity of the break point; arithmetic portions for performing arithmetic operations based on the coefficients to subject input data to gamma correction; and a result selection portion for making a suitable selection from among results for the arithmetic operations. Thus, it is possible to obtain a gamma correction broken line approximating an ideal gamma correction curve, and achieve a smooth correction characteristic with a small number of data items.

17 Claims, 5 Drawing Sheets

DIGITAL GAMMA CORRECTION CIRCUIT AND DIGITAL GAMMA CORRECTION METHOD

BACKGROUND OF THE INVENTION

1. Field of the Invention

The present invention relates to gamma correction, and more specifically to a digital gamma correction circuit and a digital gamma correction method, which are mainly used in display devices such as liquid crystal displays (LCDs) and plasma display panels (PDPs).

2. Description of the Background Art

Recent years have seen an increase in use of high-definition and high image quality display devices, e.g., liquid crystal displays, in electronic equipment, such as cell phones and digital cameras, which performs digital image processing. For such display devices, a digital gamma correction circuit for performing gamma correction on inputted digital image data is indispensable for displaying an image more naturally. Also, in electronic equipment, such as scanners and printers, which performs digital image processing, the digital gamma correction circuit is indispensable for outputting more natural image data.

Conventionally, two known methods as described below have been employed in such digital gamma correction circuits used for liquid crystal displays and the like. In the first method, conversion values are suitably set depending on gamma characteristics of liquid crystal panels for which the conversion values are used, and previously stored in a look-up table (hereinafter, abbreviated as "LUT") set in a read-only memory (ROM), and a digital gamma correction circuit reads a conversion value corresponding to the value of inputted digital image data from the LUT to perform gamma correction. In the second method, the digital gamma correction circuit subjects inputted digital image data to linear approximation in each of a plurality of predetermined divided sections, and based on the approximate straight line, the digital gamma correction circuit calculates a conversion value corresponding to the digital image data to perform gamma correction.

Some conventional digital gamma correction circuits employing the first method are configured to read correction data corresponding to a characteristic of a display device, which is previously stored in an LUT set in a read-only memory, based on data obtained by adding a predetermined offset value to an inputted video signal. Such configuration is disclosed in, for example, Japanese Laid-Open Patent Publication No. 8-51557 (Patent Document 1).

In addition, some conventional digital gamma correction circuits employing the second method are configured to divide a gamma correction curve, which is ideal for a gamma characteristic of a display device such as a liquid crystal panel, into a plurality of sections, and approximate the gamma correction curve with a plurality of straight lines connected in the vicinity of the border between two adjacent sections to obtain coefficients for primary expressions for each of the straight lines represented by the primary expressions, such that gamma correction is performed on inputted video data based on the primary expressions with the obtained coefficients. Such configuration is disclosed in, for example, Japanese Laid-Open Patent Publication No. 11-32237 (Patent Document 2).

Further, some conventional digital gamma correction circuits employing the second method are configured to perform high-speed gamma correction on video data by approximating a gamma correction curve, which is ideal for a gamma characteristic of a display device such as a liquid crystal panel, with a plurality of straight lines, fixing the position (e.g., an X-coordinate) of a break point corresponding to inputted data and calculating the position (e.g., a Y-coordinate) of a break point corresponding to output data before receiving the video data. Such configuration is disclosed in Japanese Laid-Open Patent Publication No. 11-120344 (Patent Document 3).

However, the conventional digital gamma correction circuit disclosed in Patent Document 1 is required to have stored in the LUT the correction data corresponding to gamma characteristics of display devices, such as liquid crystal panels, as conversion values for all video data. Thus, there is a problem that as the number of bits in inputted video data increases, the number of correction data items that have to be previously stored becomes significantly large.

In addition, the conventional digital gamma correction circuits disclosed in Patent Documents 2 and 3 are required to separately set suitable division points for the above-described sections in order to deal with display devices with various gamma characteristics, and therefore in order to achieve a smooth correction characteristic similar to a gamma correction curve ideal for each display device, it is necessary to increase the number of divided sections. However, these conventional digital gamma correction circuits are required to separately set positions of break points corresponding to input data and output data in accordance with the number of divided sections, and therefore there is a problem that the number of data items concerning the positions that have to be previously set increases with the number of divided sections.

SUMMARY OF THE INVENTION

Therefore, an object of the present invention is to provide a digital gamma correction circuit and a gamma correction method capable of achieving a smooth correction characteristic with a small number of data items that have to be previously set in order to deal with display devices with various characteristics.

The present invention has the following features to attain the object mentioned above.

Specifically, the present invention is embodied as a digital gamma correction circuit for performing gamma correction on input image data by defining a gamma correction broken line approximating an ideal gamma correction curve, the circuit including: a data setting portion for setting set values for defining the gamma correction broken line, the set values representing a broken baseline including one or more break points and (N−1) approximate line segments provided for each break point and having their respective slopes obtained by dividing a difference in slope between two line segments adjacent at the break point included in the broken baseline into N, N being an integer of 2 or more; a coefficient calculation portion for calculating coefficients for primary expressions representing the approximate line segments based on the set values set by the data setting portion; (N−1) arithmetic portions for calculating (N−1) output candidate values as candidates for an output value that is obtained by subjecting the input image data to the gamma correction, based on, among the coefficients calculated by the coefficient calculation portion, coefficients for (N−1) primary expressions representing (N−1) approximate line segments at a break point corresponding to a value of the input image data; and a result selection portion for selecting an output candidate value corresponding to the gamma correction broken line from among the (N−1) output candidate values calculated by the arithmetic portions, and setting the selected output candidate value as the output value that is obtained by subjecting the input image data to the gamma correction.

Thus, the gamma correction broken line is defined based on the set values representing a broken baseline forming the basis for defining the gamma correction broken line and the approximate line segments obtained by setting for all break points the (N−1) approximate line segments having their respective slopes obtained by dividing a difference in slope between two line segments adjacent at each break point included in the broken baseline into N (where N is an integer of 2 or more), and therefore it is possible to reduce the number of data items that have to be set in order to deal with display devices with various characteristics, and obtain a corrected output value in accordance with the gamma correction broken line defined by the approximate line segments having their slopes obtained by dividing the difference in slope, whereby it is possible to achieve a smooth correction characteristic.

In the present invention, when the broken baseline is convex upward at the break point corresponding to the value of the input image data, the result selection portion may select a minimum value from among the (N−1) output candidate values calculated by the arithmetic portions, whereas when the broken baseline is convex downward, the result selection portion may select a maximum value from among the (N−1) output candidate values calculated by the arithmetic portions. The selected output candidate value may be set as the output value that is obtained by subjecting the input image data to the gamma correction.

Thus, at a break point corresponding to the value of input image data, when the broken baseline is convex upward, the minimum value is selected from among the output candidate values, whereas when the broken baseline is convex downward, the maximum value is selected, and therefore a corrected output value in accordance with the gamma correction broken line can be obtained in a more simplified manner by using the approximate line segments.

Further, in the present invention, set values may be set for representing the broken baseline and the (N−1) approximate line segments provided for each break point and having their respective slopes, the (N−1) approximate line segments being obtained by sequentially connecting a division point, which is selected in decreasing order of distance to the break point from among (N−1) division points set on one of the two line segments adjacent at the break point included in the broken baseline, to a division point, which is selected in increasing order of distance to the break point from among (N−1) division points set on the other of the two line segments.

Thus, the (N−1) approximate line segments are obtained for each break point by sequentially connecting the division point, which is selected in decreasing order of distance to the break point from among the (N−1) division points set on one of the two line segments adjacent at the break point, to a division point, which is selected in increasing order of distance to the break point from among the (N−1) division points set on the other of the two line segments, and therefore it is possible to divide the difference in slope in a simplified manner by using the division points, thereby reducing the amount of computation.

Furthermore, in the present invention, the data setting portion may set coordinates of each break point and a first predetermined interval. Based on the coordinates of each break point and the first interval set by the data setting portion, the coefficient calculation portion may calculate coordinates of the (N−1) division points on the one of the two line segments, such that distances from each break point on the one of the two line segments to a division point closest to the break point and intervals between adjacent division points on the line segment are all equal to the first interval, and based on a second interval calculated based on the first interval set by the data setting portion, the coefficient calculation portion may calculate coordinates of the (N−1) division points on the other of the two line segments, such that distances from each break point on the other of the two line segments to a division point closest to the break point and intervals between adjacent division points on the line segment are all equal to the second interval. The coefficients for the primary expressions representing the approximate line segments may be calculated based on the calculated coordinates of the division points.

Thus, the gamma correction broken line is defined by setting only the coordinates of the break points and the first interval, and therefore it is possible to significantly reduce the number of data items that have to be set in order to deal with display devices with various characteristics, thereby reducing the amount of computation.

Furthermore, in the present invention, the coefficient calculation portion includes: a first division point coordinate calculation portion for calculating the coordinates of the division points on the one of the two line segments based on the coordinates of each break point and the first interval set by the data setting portion; an interval calculation portion for calculating the second interval based on the coordinates of each breakpoint and the first interval set by the data setting portion, such that the distances from each break point on the one of the two line segments to the division point closest to the break point and the distances from each break point on the other of the two line segments to the division point closest to the break point are approximately equal; a second division point coordinate calculation portion for calculating the coordinates of the division points on the other of the two line segments based on the second interval calculated by the interval calculation portion and the coordinates of the division points set by the data setting portion; a slope/intercept calculation portion for calculating slopes and intercepts of the approximate line segments as the coefficients for the primary expressions based on the coordinates of the division points calculated by the first and second division point coordinate calculation portions; and a slope/intercept selection portion for selecting coefficients corresponding to the input image data from among the coefficients calculated by the slope/intercept calculation portion and providing the selected coefficients to the arithmetic portions.

Thus, it is possible to realize a digital gamma correction circuit with a simplified configuration capable of achieving a smooth correction characteristic with a small amount of computation and a small number of data items that have to be set in order to deal with display devices with various characteristics.

Furthermore, the present invention may be embodied as a digital gamma correction method realizing the configuration as described above or may be embodied as a program that causes a computer to execute the digital gamma correction method.

In addition, the present invention is embodied as a gamma correction data generation device for generating data for defining a gamma correction broken line approximating an ideal gamma correction curve, the device including: a data setting portion for setting set values for defining the gamma correction broken line, the set values being intended to provide a broken baseline including one or more break points and (N−1) approximate line segments provided for each break point, N being an integer of 2 or more; and a coefficient calculation portion for calculating coefficients for primary expressions representing the (N−1) approximate line segments provided for each break point, based on the set values set by the data setting portion, the (N−1) approximate line segments being obtained by sequentially connecting a division point, which is selected in decreasing order of distance to the break point from among (N−1) division points set on one of the two line segments adjacent at the break point included in the broken baseline, to a division point, which is selected in increasing order of distance to the break point from among (N−1) division points set on the other of the two line segments.

Thus, the gamma correction broken line is defined based on the set values for providing a broken baseline forming the basis for defining the gamma correction broken line and the (N−1) approximate line segments provided for each break point on the broken baseline, and therefore it is possible to reduce the number of set values that have to be set in order to deal with display devices with various characteristics, and generate gamma correction data for defining a smooth gamma correction broken line.

Also, in the present invention, the data setting portion may set coordinates of each break point and a first predetermined interval. Based on the coordinates of each break point and the first interval set by the data setting portion, the coefficient calculation portion may calculate coordinates of the (N−1) division points on the one of the two line segments, such that distances from each break point on the one of the two line segments to a division point closest to the break point and intervals between adjacent division points on the line segment are all equal to the first interval, and based on a second interval calculated based on the first interval set by the data setting portion and the coordinates of each break point, the coefficient calculation portion may calculate coordinates of the (N−1) division points on the other of the two line segments, such that distances from each break point on the other of the two line segments to a division point closest to the break point and intervals between adjacent division points on the line segment are all equal to the second interval. The coefficients for the primary expressions representing the approximate line segments may be calculated based on the calculated coordinates of the division points.

Thus, the approximate line segments can be obtained for each break point by sequentially connecting a division point, which is selected in decreasing order of distance to the break point from among the (N−1) division points set on one of the two line segments adjacent at each break point, to a division point, which is selected in increasing order of distance to the break point from among the (N−1) division points set on the other of the two line segments, and therefore it is possible to reduce the amount of computation in a simplified manner.

Furthermore, the present invention may be embodied as a gamma correction data generation method realizing the configuration as described above or may be a program that causes a computer to execute the gamma correction data generation method.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, first and second embodiments of the present invention will be described with reference to the accompanying drawings.

1. First Embodiment

1.1 Configuration and Operation of a Digital Gamma Correction Circuit

Figure 1:
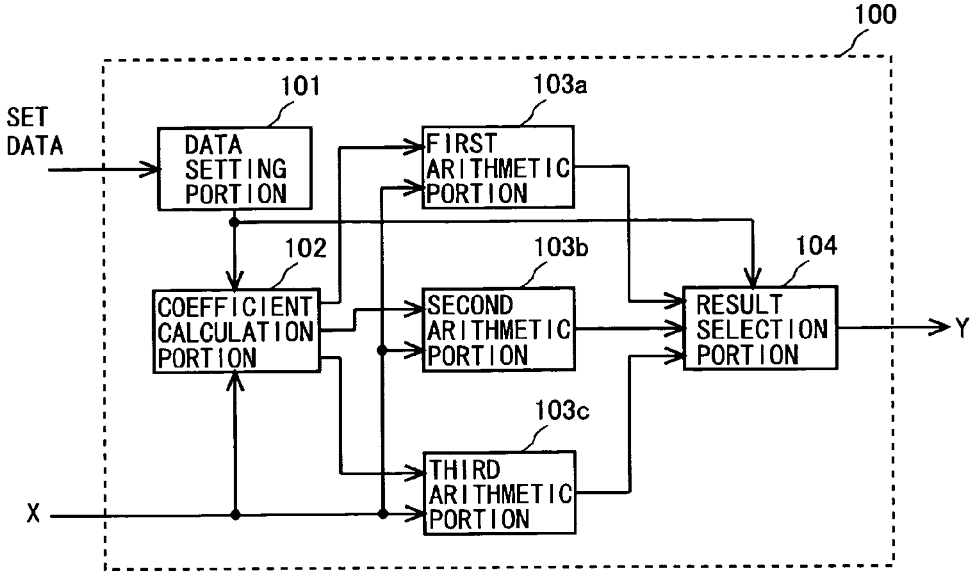
FIG. 1 is a block diagram illustrating the configuration of a digital gamma correction circuit according to a first embodiment of the present invention.

FIG. 1 is a block diagram illustrating the configuration of a digital gamma correction circuit according to the first embodiment of the present invention. As shown in FIG. 1, the digital gamma correction circuit 100 includes: a data setting portion 101 for setting set data based on externally provided numerical data; a coefficient calculation portion 102 for calculating the below-described coefficients; first through third arithmetic portions 103*a* through 103*c* for performing predetermined arithmetic operations; and a result selection portion 104 for receiving results for the arithmetic operations by the first through third arithmetic portions 103*a* through 103*c* and selecting one of the results.

The data setting portion 101 receives predetermined numerical data provided from within a computer or a display device but outside the digital gamma correction circuit 100. The numerical data is a set of numerical values for defining the below-described gamma correction broken line, which approximates an ideal gamma correction curve, and the numerical values indicate a section width W1 and coordinates (Xp,Yp) of a break point P. Although only one break point is shown here, two or more break points may exist. The case where two break points exist will be described later in the second embodiment. The data setting portion 101 sets the numerical data as set data, and provides the numerical values to the coefficient calculation portion 102. In addition, the data setting portion 101 provides the result selection portion 104 with the coordinates (Xp,Yp) of the break point P in the set data.

Although the set data has been described as being set based on the numerical data provided from outside the circuit, it may be previously stored in a storage portion included in the data setting portion 101 or another storage portion within the circuit. In such a case, the data setting portion 101 provides other portions with the set data previously stored in that storage portion.

The coefficient calculation portion 102 receives digital input data X for video display, which is provided from within the computer or the display device but outside the digital gamma correction circuit 10. The digital gamma correction circuit 100 performs gamma correction on the input data X, and outputs gamma-corrected digital output data Y. Based on the input data X as well as the section width W1 and the break point P (Xp,Yp), which are received from the data setting portion 101, the coefficient calculation portion 102 calculates coefficients for straight-line equations (here, slopes and intercepts of the straight lines), which represent three line segments required for defining a gamma correction broken line (hereinafter, referred to as the "approximate line segments") and a broken line including the break point (Xp,Yp) and forming the basis for defining the gamma correction broken line (hereinafter, referred to as the "broken baseline" for distinction from the gamma correction broken line). The coefficient calculation portion 102 makes a suitable selection from the coefficients in accordance with the input data X and provides the selected coefficients to the first through third arithmetic portions 103*a* through 103*c*. Although the three approximate line segments has been described here as defining the gamma correction broken line, two or less approximate line segments may be used for reducing the number of data items or four or more approximate line segments may be used for rendering the gamma correction broken line smoother.

Figure 2:
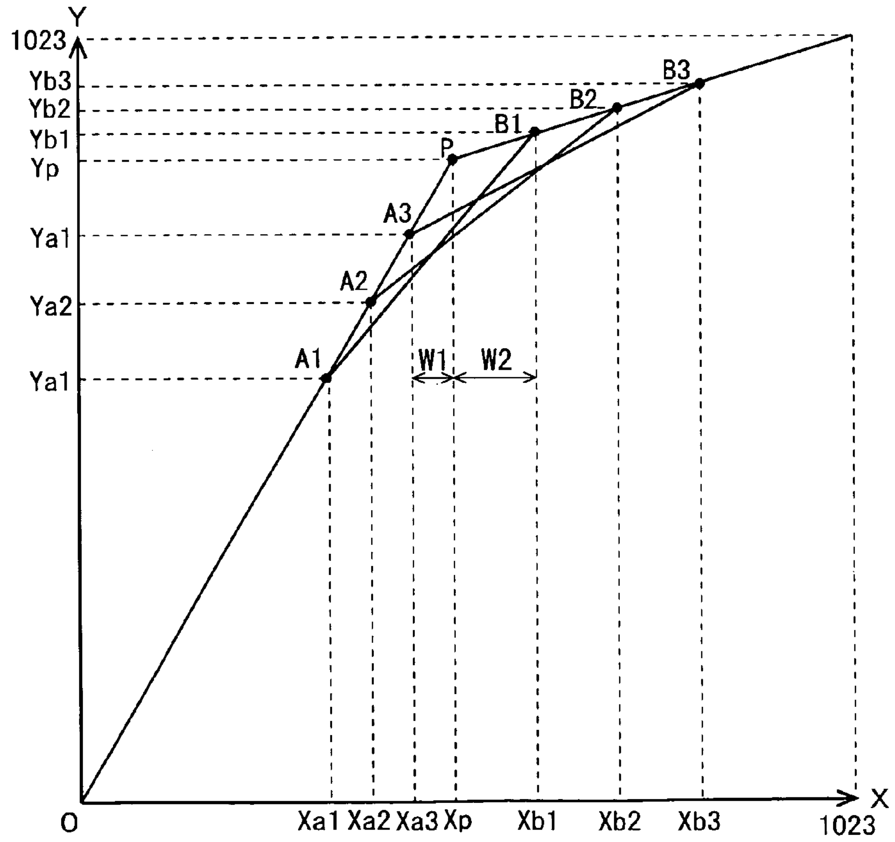
FIG. 2 is a graph illustrating three approximate line segments required for defining a gamma correction broken line and a broken baseline including a break point P in the first embodiment.

FIG. 2 is a graph illustrating three approximate line segments required for defining a gamma correction broken line and a broken baseline including a break point P. In FIG. 2, the X-axis indicates values for input data X, which is display tone data, and the Y-axis indicates values for output data Y, which is display tone data obtained by subjecting the input data X to gamma correction. Note that the input data X and the output data Y take a value from 0 to 1023 within the range of display tones.

In general, an ideal relationship for gamma correction between input data and output data is represented by a gamma correction curve. However, if the curve is represented by coordinate data, the number of data items becomes significant as described above in relation to the second method, or if the curve is arithmetically calculated, the amount of computation becomes large. Therefore, the above relationship is often represented by a gamma correction broken line, which is an approximate straight line for the curve. In the present embodiment, the gamma correction broken line is defined as shown in FIG. 2 by a broken baseline including a break point P (Xp,Yp), an approximate line segment extending between points A1 and B1 (hereinafter, referred to as the "approximate line segment A1-B1"), an approximate line segment extending between points A2 and B2 (hereinafter, referred to as the "approximate line segment A2-B2"), and an approximate line segment extending between points A3 and B3 (hereinafter, referred to as the "approximate line segment A3-B3").

The reason for defining the gamma correction broken line by both the broken baseline and the approximate line segments as described above is to smooth an abrupt change at the break point in the slope of the broken baseline. Specifically, as shown in FIG. 2, the slopes of the above three approximate line segments having end points on the broken baseline determined by the above combination between the points A1 through A3 and the points B1 through B3 correspond to their respective values, which are obtained by dividing into four sections the range between two values representing slopes (i.e., the difference between the slopes) of two line segments forming the broken baseline, i.e., a line segment from coordinates (0,0) to the break point P and a line segment from the break point P to coordinates (1023,1023). By using the approximate line segments obtained by dividing the difference in slope as described above, with their slopes gradually varying from segment to segment, in order to define the gamma correction broken line, it is made possible to smooth a change in slope in the vicinity of the break point P on the gamma correction broken line. The end points A1 through A3 and B1 through B3 of the above three approximate line segments are used for dividing the difference between the slopes, and therefore also referred to as the "points of division". By using these points of division as the end points to define the three approximate line segments, it is made possible to perform the above division in a simplified manner, thereby reducing the amount of computation.

Note that the broken baseline itself may be a simplified broken line (i.e., a broken line with a small number of break points) approximating an ideal gamma correction curve, but it is preferred to determine the broken baseline with consideration of the relationship with the approximate line segments, such that the gamma correction broken line for the gamma correction circuit 100 approximates an ideal gamma correction curve as much as possible. In addition, it is previously determined based on the display tone range of the input data X that the broken baseline passes through the coordinates (0,0) and (1023,1023).

As shown in FIG. 2, the points A1 through A3 and B1 through B3 lie on the broken baseline, intervals along the X-axis between the break point P and the point A3, between the points A3 and A2 and between the points A2 and A1 (differences between their X-coordinates) are equal to a section width W1, and intervals along the X-axis between the break point P and the point B1, between the points B1 and B2 and between the points B2 and B3 are equal to a section width W2. The following description is given with reference to FIG. 3 and with respect to the detailed configuration of the coefficient calculation portion 102, which calculates the coefficients for straight-line equations representing the broken baseline and the three approximate line segments defined by the points A1 through A3 and B1 through B3, and makes a suitable selection from the calculated coefficients to provide the selected coefficients to the first through third arithmetic portions 103*a* through 103*c*.

Figure 3:
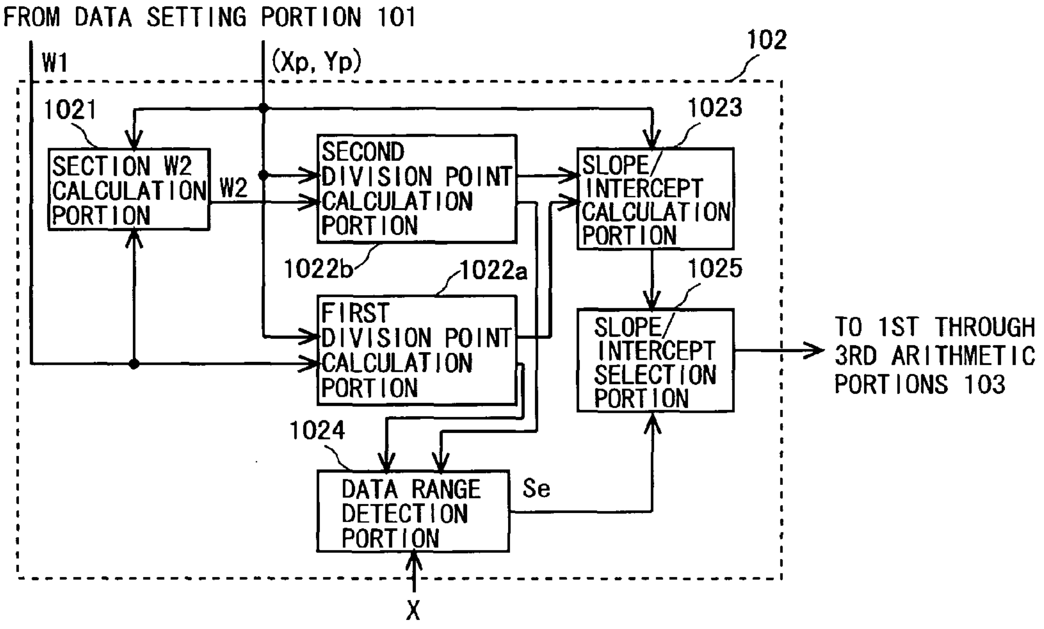
FIG. 3 is a block diagram illustrating the detailed configuration of a coefficient calculation portion in the first embodiment.

FIG. 3 is a block diagram illustrating the detailed configuration of the coefficient calculation portion 102. As shown in FIG. 3, the coefficient calculation portion 102 includes a section width W2 calculation portion 1021, first and second division point calculation portions 1022*a* and 1022*b*, a slope/intercept calculation portion 1023, a data range detection portion 1024 and a slope/intercept selection portion 1025.

The section width W2 calculation portion 1021 receives the section width W1 and the break point coordinates P(Xp, Yp) from the data setting portion 101, and calculates, based on these values, the above-mentioned section width W2 such that a distance between the break point P and the point A3 and a distance between the break point P and the point B1 are approximately equal to each other. The calculated section width W2 is provided to the second division point calculation portion 1022*b*.

The first division point calculation portion 1022*a* receives the section width W1 and the break point coordinates P (Xp, Yp) from the data setting portion 101, and calculates coordinates A1(Xa1,Ya1), A2(Xa2,Ya2) and A3(Xa3,Ya3) of the points A1, A2 and A3 on the straight line extending between the point P and the coordinates (0,0) that are positioned in sequence from the left in FIG. 2 so as to be spaced at intervals of the section width W1 along the X-axis. The calculated coordinates are provided to the slope/intercept calculation portion 1023.

The second division point calculation portion 1022*b* receives the break point coordinates P(Xp,Yp) from the data setting portion 101, and the section width W2 from the section width W2 calculation portion 1021, and the second division point calculation portion 1022*b* then calculates coordinates B1(Xb1,Yb1), B2(Xb2,Yb2) and B3(Xb3,Yb3) of the points B1, B2 and B3 on the straight line extending between the point P and the coordinates (1023,1023) that are positioned in sequence from the left in FIG. 2 so as to be spaced at intervals of the section width W2 along the X-axis. The calculated coordinates are all provided to the slope/intercept calculation portion 1023, and among these coordinates, Xa1 and Xb3, which are the X-coordinates of the points A1 and B3, respectively, are further provided to the data range detection portion 1024.

Based on the coordinates of the points A1 through A3 and B1 through B3 received from the first and second division point calculation portions 1022*a* and 1022*b* and the break point coordinates P(Xp,Yp) received from the data setting portion 101, the slope/intercept calculation portion 1023 calculates slopes and intercepts (Y-intercepts) of the straight line extending from the break point P to the left portion of the broken baseline in FIG. 2, the straight line extending to the right portion therefrom, and the approximate line segments A1-B1, A2-B2 and A3-B3. Note that the broken baseline passes through the coordinates (0,0) and (1023,1023) as described above. The straight lines and the approximate line segments can be expressed by the following straight-line equations (1) through (5).

$$Y=Yp/Xp\times X \quad (1)$$

$$Y=(Yb1-Ya1)/(Xb1-Xa1)\times(X-Xa1)+Ya1 \quad (2)$$

$$Y=(Yb2-Ya2)/(Xb2-Xa2)\times(X-Xa2)+Ya2 \quad (3)$$

$$Y=(Yb3-Ya3)/(Xb3-Xa3)\times(X-Xa3)+Ya3 \quad (4)$$

$$Y=(1023-Yp)/(1023-Xp)\times(X-Xp)+Yp \quad (5)$$

Note that the above equation (1) represents the straight line extending from the break point P to the left portion of the broken baseline, the above equation (5) represents the straight line extending to the right portion therefrom, the above equation (2) represents the approximate line segment A1-B1, the above equation (3) represents the approximate line segment A2-B2, and the above equation (4) represents the approximate line segment A3-B3.

The slope/intercept calculation portion 1023 provides values of the slopes and intercepts of the straight lines represented by the above equations (1) through (5) to the slope/intercept selection portion 1025.

The data range detection portion 1024 receives Xa1, which is the X-coordinate of the point A1, from the first division point calculation portion 1022*a*, Xb3, which is the X-coordinate of the point B3, from the second division point calculation portion 1022*b* and the input data X from outside the circuit.

If the input data X is less than Xa1 (X<Xa1), then the data range detection portion 1024 provides a slope/intercept selection signal Se indicating such (here, the signal indicating the numerical value "1" for the sake of convenience of description) to the slope/intercept selection portion 1025.

In addition, if the input data X is in the range from Xa1 to Xb3 (Xa1≦X≦Xb3), then the data range detection portion 1024 provides a slope/intercept selection signal Se indicating such (here, the signal indicating the numerical value "2" for the sake of convenience of description) to the slope/intercept selection portion 1025.

Further, if the input data X exceeds Xb3 (Xb3<X), then the data range detection portion 1024 provides a slope/intercept selection signal Se indicating such (here, the signal indicating the numerical value "3" for the sake of convenience of description) to the slope/intercept selection portion 1025.

The slope/intercept selection portion 1025 selects some of the slope and intercept values for the straight lines represented by the above equations (1) through (5), received from the slope/intercept calculation portion 1023, in accordance with a numerical value indicated by a slope/intercept selection signal Se received from the data range detection portion 1024, and provides them to the first through third arithmetic portions 103*a* through 103*c*.

Specifically, if the numerical value indicated by the intercept selection signal Se is "1" (X<Xa1), then the slope/intercept selection portion 1025 provides the slope and intercept values for the straight line represented by the above equation (1) to the first through third arithmetic portions 103*a* through 103*c*.

In addition, if the numerical value indicated by the intercept selection signal Se is "2" (Xa1<X<Xb3), then the slope/intercept selection portion 1025 provides the slope and intercept values for the straight line represented by the above equation (2) to the first arithmetic portion 103*a*, the slope and intercept values for the straight line represented by the above equation (3) to the second arithmetic portion 103*b* and the slope and intercept values for the straight line represented by the above equation (4) to the third arithmetic portion 103*c*.

Further, if the numerical value indicated by the intercept selection signal Se is "3" (Xb3<X), then the slope/intercept selection portion 1025 provides the slope and intercept values for the straight line represented by the above equation (5) to the first through third arithmetic portions 103*a* through 103*c*.

Note that of all the above components included in the coefficient calculation portion 102, the section width W2 calculation portion 1021, the first and second division point calculation portions 1022*a* and 1022*b* and the slope/intercept calculation portion 1023 do not have to operate more than once unless the set data set by the data setting portion 101 is changed, and therefore they cease to operate until the set data is changed. In addition, unlike the above components, the data range detection portion 1024 and the slope/intercept selection portion 1025 are required to operate in accordance with the input data X. Therefore, in fact, the data range detection portion 1024 and the slope/intercept selection portion 1025 include a storage portion for temporarily storing a received value, and are assumed to operate in accordance with the value stored in the storage portion until the set data is changed. However, in order to avoid abnormal display when the set data is changed while a screen is being displayed, for example, it is also preferred to configure the section width W2 calculation portion 1021, the first and second division point calculation portions 1022*a* and 1022*b* and the slope/intercept calculation portion 1023 to operate for each vertical blanking interval of a video signal.

Referring back to FIG. 1, the first through third arithmetic portions 103*a* through 103*c* receive the slope and intercept values (i.e., the above-described coefficients) from the coefficient calculation portion 102 including the slope/intercept selection portion 1025, and calculate candidate values for output data Y, which is obtained by substituting the input data X received from outside the circuit into the straight-line equations having the above coefficients. The candidate values for output data Y from the first through third arithmetic portions 103*a* through 103*c* are provided to the result selection portion 104.

Based on the coordinates (Xp,Yp) of the break point P, the result selection portion 104 selects either a minimum or maximum value from among the candidate values for output data Y from the first through third arithmetic portions 103_a_ through 103_c_, and outputs it as output data Y from the digital gamma correction circuit 100. Specifically, if the coordinates (Xp,Yp) of the break point P lie above (and to the left of) the straight line extending between the coordinates (0,0) and (1023,1023), i.e., if the broken baseline is convex upward, the result selection portion 104 selects a minimum value from among the plurality of candidate values for output data Y. If the coordinates (Xp,Yp) of the break point P lies below (and to the right of) the straight line, i.e., if the broken baseline is convex downward, the result selection portion 104 selects a maximum value from the plurality of candidate values for output data Y. However, the broken baseline shown in FIG. 2 is convex upward, the result selection portion 104 in the present embodiment always selects the minimum value. Note that if the input data X is less than Xa1 (X<Xa1) or greater than Xb3 (Xb3<X), the candidate values for output data Y outputted from the first through third arithmetic portions 103_a_ through 103_c_ are all equal to each other, and therefore any of the values may be selected without the need to select the minimum value.

Figure 4:
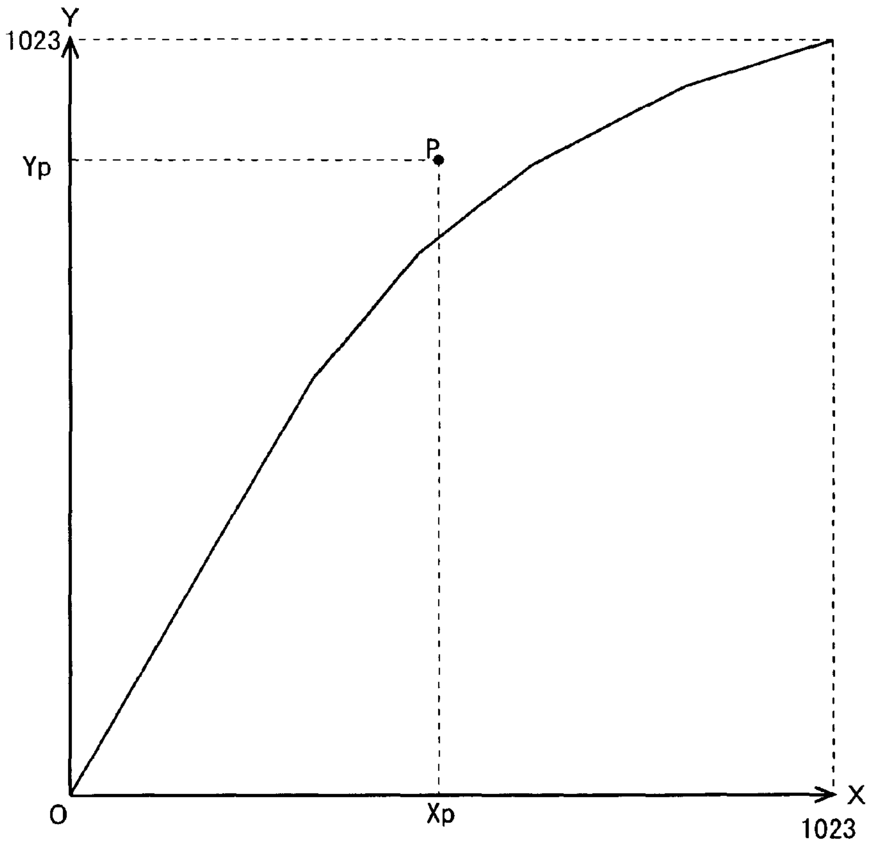
FIG. 4 is a graph illustrating a gamma correction broken line representing the relationship between input data X and output data Y in the first embodiment.

The relationship between the input data X and the output data Y outputted from the result selection portion 104 is represented by a gamma correction broken line approximating an ideal gamma correction curve. FIG. 4 is a graph illustrating the gamma correction broken line representing the relationship between the input data X and the output data Y. As shown in FIG. 4, the slope of the gamma correction broken line gradually and smoothly changes without experiencing an abrupt change in the vicinity of the break point P, and therefore the characteristic of correction by the digital gamma correction circuit 100 can be considered as smooth.

1.2 Effects of the First Embodiment

As described above, the digital gamma correction circuit 100 according to the present embodiment is made capable of obtaining a gamma correction broken line as shown in FIG. 4, which approximates an ideal gamma correction curve, by providing it with only information from outside the circuit, concerning the section width W1 and the coordinates (Xp, Yp) of the break point P, and therefore a smooth correction characteristic can be achieved with a small number of data items, which have to be set in order to deal with display devices with various characteristics.

2. Second Embodiment

2.1 Configuration and Operation of a Digital Gamma Correction Circuit

While the first embodiment has been described with respect to the case where there is one set of break point coordinates, the following second embodiment will be described with respect to a case where there are two sets of break point coordinates. Since a digital gamma correction circuit according to the second embodiment is configured in almost the same manner as shown in FIG. 1, almost the same elements are denoted by the same reference characters and the same functions are not described in detail herein. In addition, a coefficient calculation portion 202 in the second embodiment is configured to have a function similar to that of the coefficient calculation portion 102 shown in FIG. 3, but unlike the coefficient calculation portion 102, the coefficient calculation portion 202 in the second embodiment requires three approximate line segments in each of two sets of break point coordinates, i.e., six approximate line segments in total, in order to define an approximate curve for gamma correction.

Figure 5:
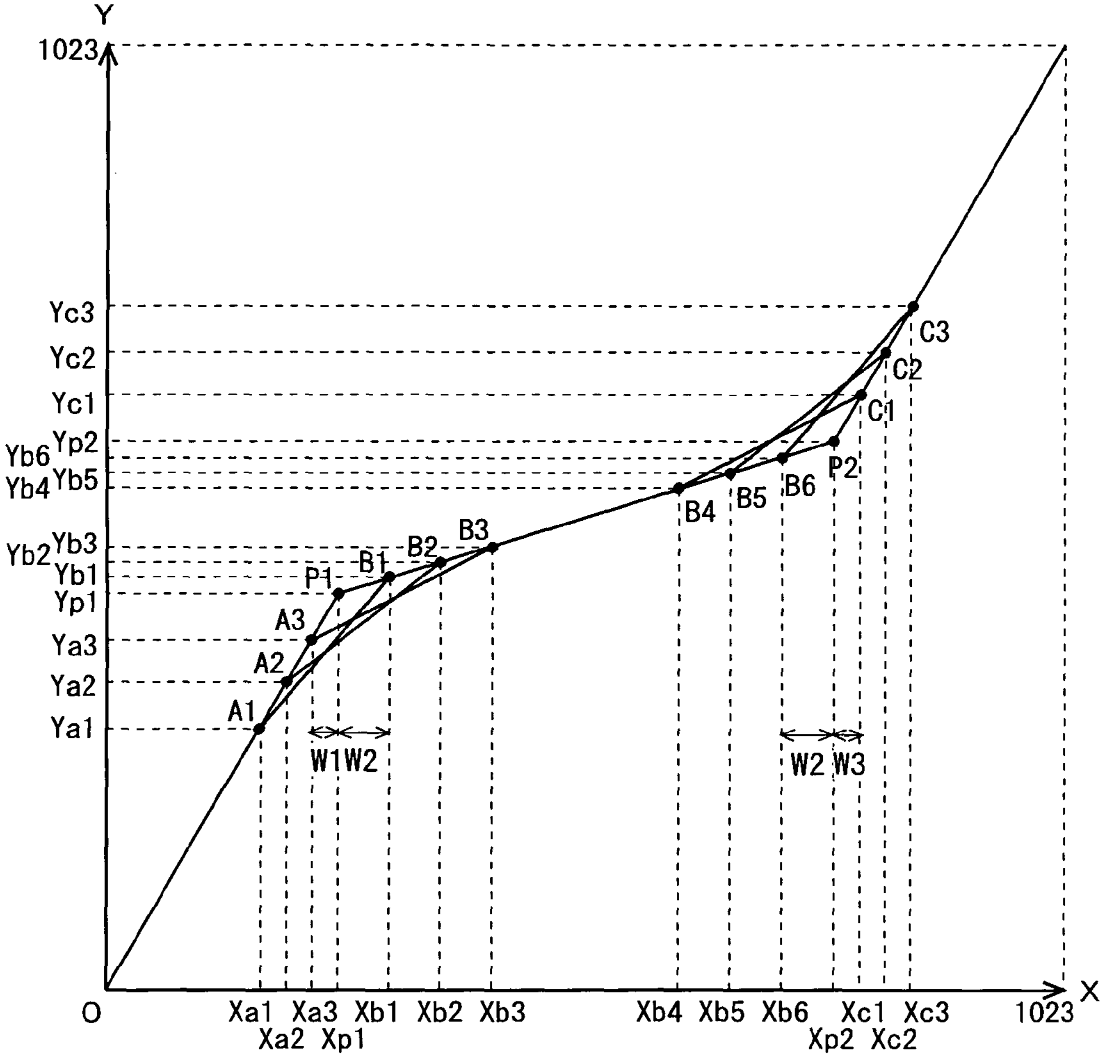
FIG. 5 is a graph illustrating a broken baseline including six approximate line segments and two break points P1 and P2 required for defining a gamma correction broken line in a second embodiment of the present invention.

FIG. 5 is a graph illustrating a broken baseline including six approximate line segments and two break points P1 and P2 required for defining a gamma correction broken line in the second embodiment. As shown in FIG. 5, points A1 through A3, points B1 through B6 and points C1 through C3 lie on the broken baseline. As in the first embodiment, intervals along the X-axis between the break point P1 and the point A3, between the points A3 and A2 and between the points A2 and A1 (differences between their X-coordinates) are equal to a section width W1, and intervals along the X-axis between the break point P1 and the point B1, between the points B1 and B2 and between the points B2 and B3 are equal to a section width W2. In addition, intervals between the points B4 and B5, between the points B5 and B6 and between the point B6 and the break point P2 are equal to the section width W2. Furthermore, intervals between the break point P2 and the point C1, between the points C1 and C2 and between the points C2 and C3 are equal to a section width W3.

The coefficient calculation portion 202 in the second embodiment calculates coefficients for straight-line equations defining the broken baseline and the six approximate line segments defined by the above-mentioned points, and makes a suitable selection from among the calculated coefficients. Hereinbelow, the configuration and operation of the coefficient calculation portion 202 will be described in detail with reference to FIG. 6.

Figure 6:
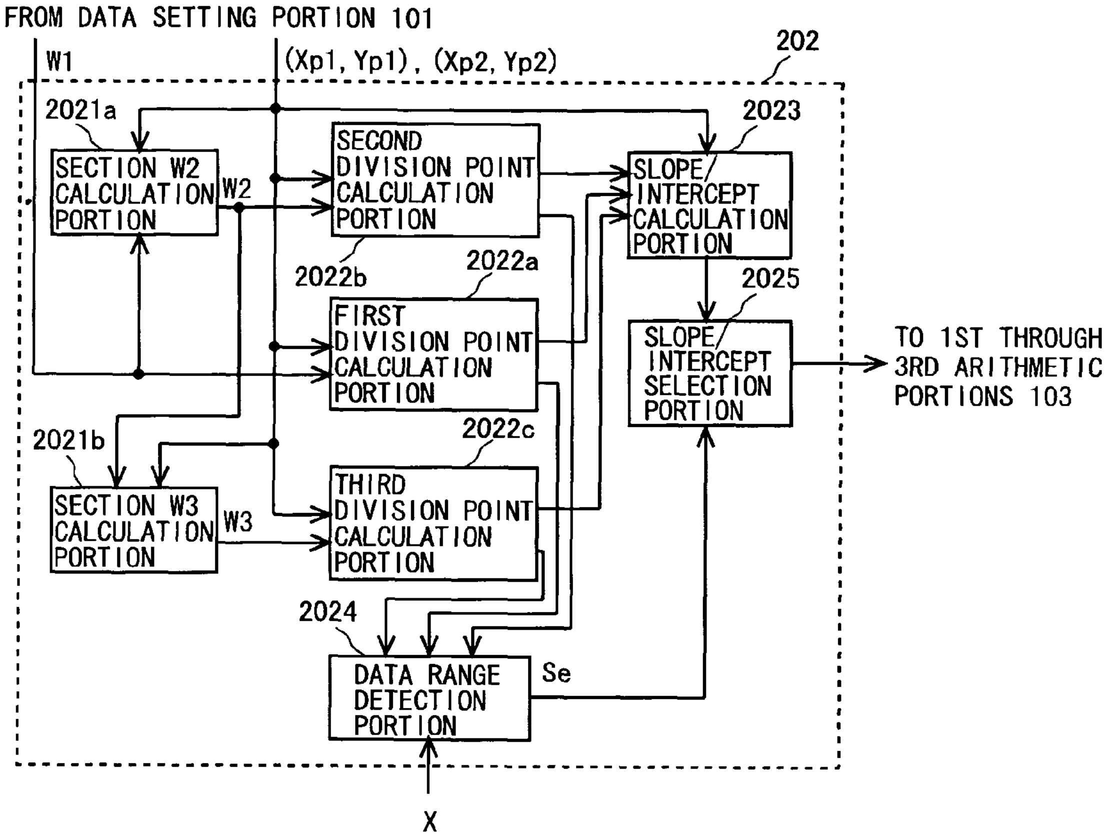
FIG. 6 is a block diagram illustrating the detailed configuration of a coefficient calculation portion in the second embodiment.

FIG. 6 is a block diagram illustrating the detailed configuration of the coefficient calculation portion 202. As shown in FIG. 6, the coefficient calculation portion 202 includes: a section width W2 calculation portion 2021_a_ functioning in a manner similar to the section width W2 calculation portion 1021 of the coefficient calculation portion 102 in the first embodiment; first and second division point calculation portions 2022_a_ and 2022_b_ functioning in a manner roughly similar to the first and second division point calculation portions 1022_a_ and 1022_b_ of the coefficient calculation portion 102; a slope/intercept calculation portion 2023 functioning similar to the slope/intercept calculation portion 1023; a data range detection portion 2024 functioning similar to the data range detection portion 1024; and a slope/intercept selection portion 2025 functioning similar to the slope/intercept selection portion 1025. In addition, the coefficient calculation portion 202 includes a section width W3 calculation portion 2021_b_ and a third division point calculation portion 2022_c_, which are not included in the coefficient calculation portion 102.

Note that in the case where there are only two types of slopes for three line segments forming a broken baseline including two break points, i.e., a line segment from coordinates (0,0) to the break point P1 and a line segment from the break point P2 to coordinates (1023,1023) have the same slope (or almost the same slope), the section width W3 is equal (or almost equal) to the section width W1, and therefore if the section width W1 is used in place of the section width W3, it is possible to eliminate the section width W3 calculation portion 2021_b_ and the third division point calculation portion 2022_c_. In such a case, similar gamma correction can be performed with a configuration almost similar to that of the coefficient calculation portion 102 in the first embodiment, but the following description is given on the assumption that the above three line segments have a different slope from one another, rather than that there are only two types of slopes for the three line segments.

The section width W2 calculation portion 2021_a_ receives the section width W1 and break point coordinates P1 (Xp1, Yp1) from the data setting portion 101, and calculates, based on these values, the above-mentioned section width W2 such that the distance between the break point P1 and the point A3 and the distance between the break point P1 and the point B1 are almost equal to each other. The calculated section width W2 is provided to the section width W3 calculation portion 2021*b* and the second division point calculation portion 2022*b*.

The section width W3 calculation portion 2021*b* receives the section width W2 from the section width W2 calculation portion 2021*a* and break point coordinates P2(Xp2,Yp2) from the data setting portion 101, and calculates, based on these values, the above-mentioned section width W3 such that the distance between the break point P2 and the point B6 and the distance between the break point P2 and the point C1 are almost equal to each other. The calculated section width W3 is provided to the third division point calculation portion 2022*c*.

The third division point calculation portion 2022*c* receives the section width W3 from the section width W3 calculation portion 2021*b* and the break point coordinates P2(Xp2,Yp2) from the data setting portion 101, and calculates coordinates C1(Xc1,Yc1), C2(Xc2,Yc2) and C3(Xc3,Yc3) of the points C1, C2 and C3 on the straight line extending between the point P2 and the coordinates (1023,1023) that are positioned in sequence from the left in FIG. 5 so as to be spaced at intervals of the section width W3 along the X-axis.

The coordinates of the points C1 through C3 calculated by the third division point calculation portion 2022*c* are provided to the slope/intercept calculation portion 2023 together with coordinates calculated by the first and second division point calculation portions 2022*a* and 2022*b*. Note that unlike the second division point calculation portion 1022*b* in the first embodiment, the second division point calculation portion 2022*b* calculates coordinates B1(Xb1,Yb1), B2(Xb2,Yb2) and B3(Xb3,Yb3) of the points B1 through B3 on the straight line extending between the break points P1 and P2 that are positioned in sequence from the left in FIG. 5 so as to be spaced at intervals of the section width W2 along the X-axis, and coordinates B4(Xb4,Yb4), B5(Xb5,Yb5) and B6(Xb6, Yb6) of the points B4 through B6 that are similarly positioned in sequence.

Note that the section width W3 is calculated such that the distance between the break point P2 and the point B6 and the distance between the break point P2 and the point C1 are almost equal to each other, but instead of this, the section width W3 may be provided from outside the device. In the case where the section width W3 is externally provided in such a manner, a section width W2' calculation portion may be additionally provided for calculating, based on the section width W3, a section width W2' equal to intervals along the X-axis between the points B6 and B5 and between the points B5 and B4, such that the distance between the break point P2 and the point C1 and the distance between the break point P2 and the point B6 are almost equal to each other, and a fourth division point calculation portion may be additionally provided for calculating coordinates of the points B4 through B6 based on the section width W2'.

Based on the calculated coordinates of the points A1 through A3, B1 through B6 and C1 through C3 and the break point coordinates P1(Xp1,Yp1) and P2(Xp2,Yp2) received from the data setting portion 101, the slope/intercept calculation portion 2023 calculates slopes and intercepts (Y-intercepts) of the straight line extending from the break point P1 to the left portion of the broken baseline in FIG. 5, the straight line extending to the right between the break points P1 and P2, the straight line extending to the right portion from the break point P2 and the approximate line segments A1-B1, A2-B2, A3-B3, B4-C1, B5-C2 and B6-C3. Note that it is predetermined based on the display tone range of the input data X that the broken baseline passes through the coordinates (0,0) and (1023,1023). The straight lines and the approximate line segments can be expressed by the following straight-line equations (6) through (14).

$$Y=Yp1/Xp1\times X \quad (6)$$

$$Y=(Yb1-Ya1)/(Xb1-Xa1)\times(X-Xa1)+Ya1 \quad (7)$$

$$Y=(Yb2-Ya2)/(Xb2-Xa2)\times(X-Xa2)+Ya2 \quad (8)$$

$$Y=(Yb3-Ya3)/(Xb3-Xa3)\times(X-Xa3)+Ya3 \quad (9)$$

$$Y=(Yp2-Yp1)/(Xp2-Xp1)\times(X-Xp1)+Yp1 \quad (10)$$

$$Y=(Yc1-Yb4)/(Xc1-Xb4)\times(X-Xc1)+Yc1 \quad (11)$$

$$Y=(Yc2-Yb5)/(Xc2-Xb5)\times(X-Xc2)+Yc2 \quad (12)$$

$$Y=(Yc3-Yb6)/(Xc3-Xb6)\times(X-Xc3)+Yc3 \quad (13)$$

$$Y=(1023-Yp2)/(1023-Xp2)\times(X-Xp2)+Yp2 \quad (14)$$

Note that the above equation (6) represents the straight line extending from the break point P1 to the left portion of the broken baseline, the above equation (10) represents the straight line extending between the break points P1 and P2, the above equation (14) represents the straight line extending from the break point P1 to the left portion, the above equation (7) represents the approximate line segment A1-B1, the above equation (8) represents the approximate line segment A2-B2, the above equation (9) represents the approximate line segment A3-B3, the above equation (11) represents the approximate line segment B4-C1, the above equation (12) represents the approximate line segment B5-C2, and the above equation (13) represents the approximate line segment B6-C3.

The data range detection portion 2024 in the second embodiment receives Xa1, which is the X-coordinate of the point A1, from the first division point calculation portion 2022*a*, and Xb3 and Xb4, which are the X-coordinates of the points B3 and B4, respectively, from the second division point calculation portion 2022*b*, and the data range detection portion 2024 further receives Xc3, which is the X-coordinate of the point C3, from the third division point calculation portion and the input data X from outside the circuit.

If the input data X is less than Xa1 (X<Xa1), then the data range detection portion 2024 provides a slope/intercept selection signal Se indicating such (here, the signal indicating the numerical value "1" for the sake of convenience of description) to the slope/intercept selection portion 2025.

In addition, if the input data X is in the range from Xa1 to Xb3 (Xa1≦X≦Xb3), then the data range detection portion 2024 provides a slope/intercept selection signal Se indicating such (here, the signal indicating the numerical value "2" for the sake of convenience of description) to the slope/intercept selection portion 2025.

Further, if the input data X exceeds Xb3 but does not exceed Xb4 (Xb3<X<Xb4), then the data range detection portion 2024 provides a slope/intercept selection signal Se indicating such (here, the signal indicating the numerical value "3" for the sake of convenience of description) to the slope/intercept selection portion 2025.

Furthermore, if the input data X is in the range from Xb4 to Xc3 (Xb4≦X≦Xc3), then the data range detection portion 2024 provides a slope/intercept selection signal Se indicating such (here, the signal indicating the numerical value "4" for the sake of convenience of description) to the slope/intercept selection portion 2025.

Furthermore, if the input data X exceeds Xc3 (Xc3<X), then the data range detection portion 2024 provides a slope/intercept selection signal Se indicating such (here, the signal indicating the numerical value "5" for the sake of convenience of description) to the slope/intercept selection portion 2025.

The slope/intercept selection portion 2025 in the second embodiment selects some of the slope and intercept values of the straight lines represented by the above equations (6) through (14), received from the slope/intercept calculation portion 2023, in accordance with a numerical value indicated by a slope/intercept selection signal Se received from the data range detection portion 2024, and provides them to the first through third arithmetic portions 103*a* through 103*c*.

Specifically, if the numerical value indicated by the intercept selection signal Se is "1" (X<Xa1), then the slope/intercept selection portion 2025 provides the slope and intercept values for the straight line represented by the above equation (6) to the first through third arithmetic portions 103*a* through 103*c*.

In addition, if the numerical value indicated by the intercept selection signal Se is "2" (Xa1≦X≦Xb3), then the slope/intercept selection portion 2025 provides the slope and intercept values for the straight line represented by the above equation (7) to the first arithmetic portion 103*a*, the slope and intercept values for the straight line represented by the above equation (8) to the second arithmetic portion 103*b*, and the slope and intercept values for the straight line represented by the above equation (9) to the third arithmetic portion 103*c*.

Furthermore, if the numerical value indicated by the intercept selection signal Se is "3" (Xb3<X<Xb4), then the slope/intercept selection portion 2025 provides the slope and intercept values for the straight line represented by the above equation (10) to the first through third arithmetic portions 103*a* through 103*c*.

Furthermore, if the numerical value indicated by the intercept selection signal Se is "4" (Xb4≦X≦Xc3), then the slope/intercept selection portion 2025 provides the slope and intercept values for the straight line represented by the above equation (11) to the first arithmetic portion 103*a*, the slope and intercept values for the straight line represented by the above equation (12) to the second arithmetic portion 103*b*, and the slope and intercept values for the straight line represented by the above equation (13) to the third arithmetic portion 103*c*.

Furthermore, if the numerical value indicated by the intercept selection signal Se is "5" (Xc3<X), then the slope/intercept selection portion 2025 provides the slope and intercept values for the straight line represented by the above equation (14) to the first through third arithmetic portions 103*a* through 103*c*.

Note that as in the case of the coefficient calculation portion 102 in the first embodiment, of all the above components included in the coefficient calculation portion 202 in the present embodiment, the data range detection portion 2024 and the slope/intercept selection portion 2025, which operate in accordance with the input data X, include a storage portion for temporarily storing a received value, and are assumed to operate in accordance with the value stored in the storage portion until the set data is changed. In addition, as in the first embodiment, components other than the above operate only once when the set data is provided. However, in order to avoid abnormal display when the set data is changed while a screen is being displayed, for example, it is also preferred to configure them to operate for each vertical blanking interval of a video signal.

Next, as in the first embodiment, the first through third arithmetic portions 103*a* through 103*c* in the second embodiment receive coefficients, which are the slope and intercept values, from the coefficient calculation portion 202 including the slope/intercept selection portion 2025, and calculate candidate values for output data Y, which is obtained by substituting the input data X received from outside the circuit into the straight-line equations having the above coefficients. The candidate values for output data Y from the first through third arithmetic portions 103*a* through 103*c* are provided to the result selection portion 104.

Unlike the operation in the first embodiment, the result selection portion 104 in the present embodiment suitably selects either a minimum or maximum value from among the candidate values for output data Y from the first through third arithmetic portions 103*a* through 103*c* based on the coordinates (Xp1,Yp1) of the break point P1, the coordinates (Xp2,Yp2) of the break point P2 and the slope/intercept selection signal Se received from the data range detection portion 2024, and outputs it as output data Y from the digital gamma correction circuit 100. Specifically, if the broken baseline is convex upward in the vicinity of the coordinates (Xp1,Yp1) of the break point P1 or the coordinates (Xp2,Yp2) of the break point P2, the result selection portion 104 selects the minimum value from among the plurality of candidate values for output data Y, while if the broken baseline convex downward, it selects the maximum value from among the plurality of candidate values for output data Y. Note that data indicating whether the broken baseline is convex upward or downward may be calculated by the result selection portion 104 based on the coordinates (Xp1,Yp1) of the break point P1 and the coordinates (Xp2,Yp2) of the break point P2, or it may be predetermined by the set data set by the data setting portion 101.

Herein, the broken baseline being convex upward at a predetermined break point is indicated to mean that of two line segments adjacent to each other at the break point included in the broken baseline, one that lies to the left of the break point (i.e., a line segment that is defined by X smaller than the X-coordinate of the breakpoint) has a slope greater than the slope of the other line segment that lies to the right of the break point (i.e., a line segment that is defined by X greater than the X-coordinate of the break point). In addition, the broken baseline being convex downward is indicated to mean that of the two line segments adjacent to each other at the break point, one that lies to the left of the break point has a slope smaller than the slope of the other line segment that lies to the right of the break point.

In the present embodiment, the broken baseline shown in FIG. 5 is convex upward in the vicinity of the coordinates (Xp1,Yp1) of the break point P1, and therefore if the numerical value indicated by the intercept selection signal Se is "2" (Xa1≦X≦Xb3), the result selection portion 104 selects the minimum value from among the candidate values for output data Y from the first through third arithmetic portions 103*a* through 103*c*. In addition, the broken baseline shown in FIG. 5 is convex downward in the vicinity of the coordinates (Xp2,Yp2) of the break point P2, and therefore if the numerical value indicated by the intercept selection signal Se is "4" (Xb4≦X≦Xc3), the result selection portion 104 selects the maximum value from among the candidate values for output data Y. Note that in other cases (X<Xa1, Xb3<X<Xb4, Xbc<X), the candidate values for output data Y outputted from the first through third arithmetic portions 103*a* through

103*c* are all equal to each other, and therefore any of the values may be selected without the need to select the maximum or minimum value.

Figure 7:
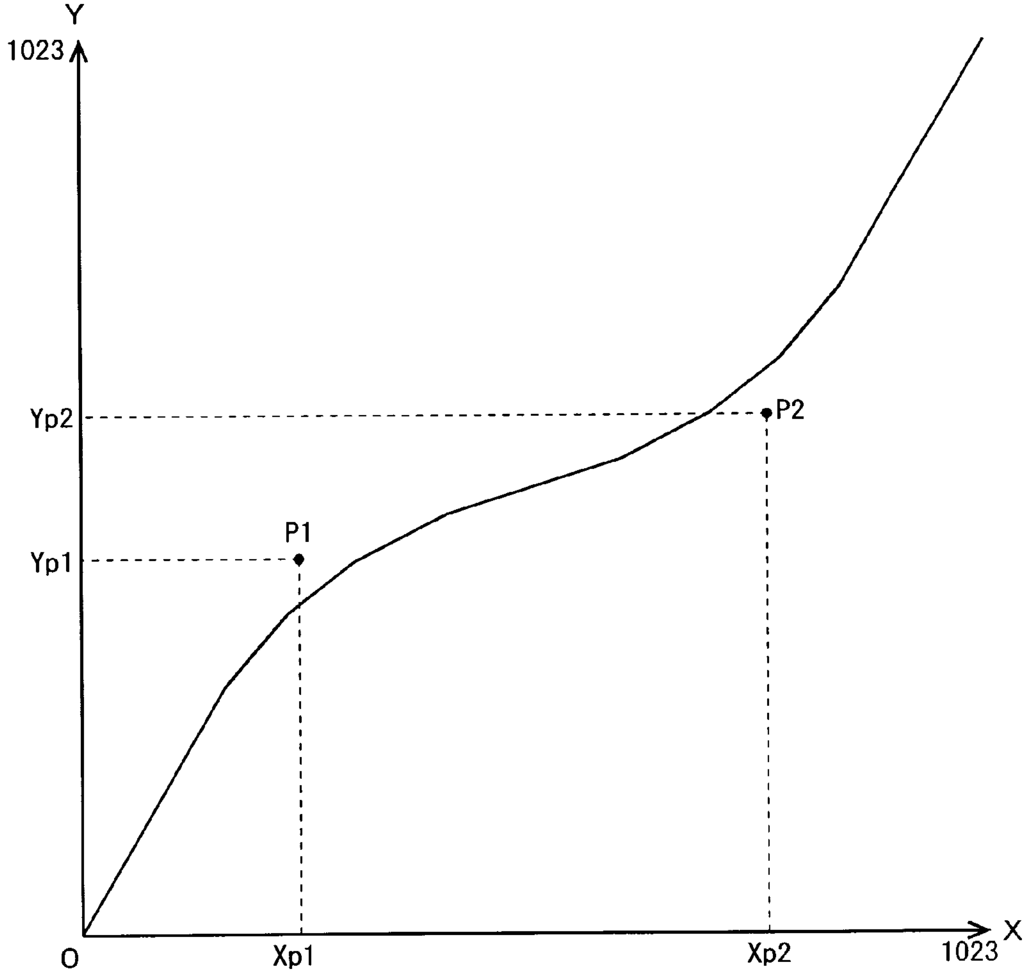
FIG. 7 is a graph illustrating a gamma correction broken line representing the relationship between input data X and output data Y in the second embodiment.

The relationship between the input data X and the output data Y outputted from the result selection portion 104 is represented by a straight line approximating an ideal gamma correction curve. FIG. 7 is a graph illustrating a gamma correction broken line representing the relationship between the input data X and the output data Y in the second embodiment. As shown in FIG. 7, the slope of the gamma correction broken line gradually and smoothly changes without experiencing an abrupt change at each of the break points P1 and P2, and therefore the characteristic of correction by the digital gamma correction circuit 100 can be considered as smooth.

2.2 Effects of the Second Embodiment

As described above, the digital gamma correction circuit in the second embodiment is made capable of obtaining a gamma correction broken line as shown in FIG. 7, which approximates an ideal gamma correction curve, by providing it with only information from outside the circuit, concerning the section width W1, the coordinates (Xp1,Yp1) of the break point P1 and the coordinates (Xp2,Yp2) of the break point P2, and therefore a smooth correction characteristic can be achieved with a small number of data items, which have to be set in order to deal with display devices with various characteristics.

3. Variant

The digital gamma correction circuits in the first and second embodiments are used to perform gamma correction on video data that is to be displayed on a display device, but this is not restrictive and the digital gamma correction circuits can be widely used in electronic equipment, such as scanners and printers, which perform image processing, in order to perform gamma correction on image data such as brightness data and density data.

The digital gamma correction circuits in the first and second embodiments are entirely composed of electronic circuits, but part or all of the components that do not have to operate more than once when numerical data from outside the circuit is received (e.g., the data setting portion 101; the section width W2 calculation portion 1021, the first division point calculation portion 1022*a*, the second division point calculation portion 1022*b* and the slope/intercept calculation portion 1023, which are included in the coefficient calculation portion 102; the section width W2 calculation portion 2021*a*, the first division point calculation portion 2022*a*, the second division point calculation portion 2022*b*, the slope/intercept calculation portion 2023, the section width W3 calculation portion 2021*b* and the third division point calculation portion 2022*c*, which are included in the coefficient calculation portion 202) may be realized by external circuits or devices other than the digital gamma correction circuit or various programs, such as software (e.g., application software), device drivers and firmware, which function in the same manner as the above components. Further more, all functions of the digital gamma correction circuits may be realized by the above-mentioned programs functioning in the same manner.

The programs may be stored in a storage device (e.g., a semiconductor memory or a hard disk) included in electronic equipment, such as a display device, or a computing device for controlling the electronic equipment (these hardware devices are collectively referred to herein as "computers"), and they are suitably read from a computer-readable storage medium, such as a CD-ROM or a DVD-ROM, or provided to the storage device via communication lines.

Described now is an example where the same functions as those of the above-described components that do not have to operate more than once are realized by a program stored in a computer as described above, and based on gamma correction data obtained by the program, gamma correction is performed by a digital gamma correction circuit in a display device different from the above computer. Accordingly, the program functions as a gamma correction data generation program.

Upon each receipt of predetermined numerical data that is externally provided, the gamma correction data generation program generates the below-described gamma correction data. The generated gamma correction data is provided to the digital gamma correction circuit, and the digital gamma correction circuit performs gamma correction on input data X and outputs output data Y.

In the gamma correction data generation program, a section width W1 and coordinates of a break point are set in a program step corresponding to the data setting portion 101.

In a program step corresponding to the section width W2 calculation portions 1021 and 2021*a* (and the section width W3 calculation portion 2021*b*), a section width W2 is calculated (along with a section width W3) based on the section width W1 and the coordinates of the break point.

In a program step corresponding to the first and second division point calculation portions 1022*a*, 1022*b*, 2022*a* and 2022*b* (and the third division point calculation portion 2022*c*), coordinates of each division point are calculated based on the coordinates of the break point and the section widths. Of all the calculated coordinates of the division points, Xa1 and Xb3 (as well as Xb4 and Xc3) are provided as part of the gamma correction data to a circuit corresponding to the data range detection portions 1024 and 2024 of the digital gamma correction circuits, which is included in the display device different from the above computer. This circuit has a storage portion similar to that as described above, and the coordinates forming a part of the gamma correction data are written to that storage portion.

Also, in a program step corresponding to the slope/intercept calculation portions 1023 and 2023, slopes and intercepts, which are coefficients for primary expressions representing approximate line segments, are calculated based on the calculated coordinates of the division points. The calculated coefficients are provided as part of the gamma correction data to a circuit corresponding to the slope/intercept selection portions 1025 and 2025 of the digital gamma correction circuits, which is included in the display device different from the above computer. This circuit also has a storage portion similar to that as described above, and the coefficients forming a part of the gamma correction data are written to that storage portion.

Based on detection results by the circuit corresponding to the data range detection portions 1024 and 2024, the circuit corresponding to the slope/intercept selection portions 1025 and 2025 selects suitable coefficients from among the coefficients, which are the slopes and intercepts of the approximate line segments stored in the storage portion, and provides them to circuits corresponding to the first through third arithmetic portions 103*a* through 103*c*. These circuits output candidate values for output data Y corresponding to the input data X in a manner as described above, and a circuit corresponding to the result selection portion 104 suitably selects values from among the candidate values and outputs them as output data Y.

As such, the gamma correction data generation program generates the gamma correction data for defining a gamma correction broken line, and sets (stores) the generated gamma correction data in the digital gamma correction circuit. Based on the gamma correction data, the digital gamma correction circuit performs gamma correction to realize a gamma correction broken line, which smoothly changes in the vicinity of a break point of a broken baseline.

Note that the gamma correction data generation program may be a separate device having the same functions as the program. Accordingly, each of the digital gamma correction circuits in the first and second embodiment may be a device or system consisting of a device provided with functions corresponding to the gamma correction data generation program and a device for receiving gamma correction data from that device and performing gamma correction.

The digital gamma correction circuits in the first and second embodiments define approximate line segments passing through the vicinity of a break point for defining a gamma correction broken line (e.g., the approximate line segments A1-B1, A2-B2 and A3-B3 in the first embodiment) as approximate line segments obtained by sequentially connecting a point, which is selected in decreasing order of distance to the break point from among points on one of two line segments adjacent at the break point included in a broken baseline (e.g., the points A1 through A3 in the first embodiment), to a point, which is selected in increasing order of distance to the break point from among points on the other of the two line segments (e.g., the points B1 through B3 in the first embodiment), but such a definition method is not restrictive. For example, the approximate line segments may be defined, such that their slopes gradually vary from segment to segment without exceeding the range between the slope of one of the two line segments and the slope of the other line segment in an area below (and to the right of) the broken baseline, which is convex upward at the break point. Specifically, (N−1) approximate line segments having their respective slopes are obtained for each break point by dividing the difference in slope between the two line segments adjacent at the break point included in the broken baseline into N (where N is an integer of 2 or more).

The digital gamma correction circuits in the first and second embodiments are configured such that the data setting portion 101 is provided with a section width W (or a section width W1) from outside the circuit to define approximate line segments, but instead of providing the data setting portion 101 with the section width indicating intervals along the X-axis between end points for defining the approximate line segments (the difference between their X-coordinates), the data setting portion 101 may be provided with values from outside the circuit, which are required for roughly defining the intervals between the end points, e.g., a section width indicating intervals along the Y-axis between the end points (the difference between their Y-coordinates).

While the invention has been described in detail, the foregoing description is in all aspects illustrative and not restrictive. It is understood that numerous other modifications and variations can be devised without departing from the scope of the invention.

Note that the present application claims priority to Japanese Patent Application No. 2005-310722, titled "DIGITAL GAMMA CORRECTION CIRCUIT AND DIGITAL GAMMA CORRECTION METHOD", filed on Oct. 26, 2005, which is incorporated herein by reference.

What is claimed is:

1. A digital gamma correction circuit for performing gamma correction on input image data by defining a gamma correction broken line approximating an ideal gamma correction curve, the circuit comprising:

a data setting portion for setting set values for defining the gamma correction broken line, the set values representing a broken baseline including one or more break points and (N−1) approximate line segments provided for each break point and having their respective slopes obtained by dividing a difference in slope between two line segments adjacent at the break point included in the broken baseline into N, N being an integer of 2 or more;

a coefficient calculation portion for calculating coefficients for primary expressions representing the approximate line segments based on the set values set by the data setting portion;

(N−1) arithmetic portions for calculating (N−1) output candidate values as candidates for an output value that is obtained by subjecting the input image data to the gamma correction, based on, among the coefficients calculated by the coefficient calculation portion, coefficients for (N−1) primary expressions representing (N−1) approximate line segments at a break point corresponding to a value of the input image data; and a result selection portion for selecting an output candidate value corresponding to the gamma correction broken line from among the (N−1) output candidate values calculated by the arithmetic portions, and setting the selected output candidate value as the output value that is obtained by subjecting the input image data to the gamma correction.

2. The digital gamma correction circuit according to claim 1, wherein when the broken baseline is convex upward at the break point corresponding to the value of the input image data, the result selection portion selects a minimum value from among the (N−1) output candidate values calculated by the arithmetic portions, whereas when the broken baseline is convex downward at the break point corresponding to the value of the input image data, the result selection portion selects a maximum value from among the (N−1) output candidate values calculated by the arithmetic portions, the selected output candidate value being set as the output value that is obtained by subjecting the input image data to the gamma correction.

3. The digital gamma correction circuit according to claim 2, wherein the data setting portion sets set values representing the broken baseline and the (N−1) approximate line segments provided for each break point and having their respective slopes, the (N−1) approximate line segments being obtained by sequentially connecting a division point, which is selected in decreasing order of distance to the break point from among (N−1) division points set on one of the two line segments adjacent at the break point included in the broken baseline, to a division point, which is selected in increasing order of distance to the break point from among (N−1) division points set on the other of the two line segments.

4. The digital gamma correction circuit according to claim 3, wherein the data setting portion sets coordinates of each break point and a first predetermined interval, and wherein based on the coordinates of each break point and the first interval set by the data setting portion, the coefficient calculation portion calculates coordinates of the (N−1) division points on the one of the two line segments, such that distances from each break point on the one of the two line segments to a division point closest to the break point and intervals between adjacent division points on the line segment are all equal to the first interval, and based on a second interval calculated based on the first interval set by the data setting portion, the coefficient calculation portion calculates coordinates of the (N−1) division points on the other of the two line segments, such that distances from each break point on the other of the two line segments to a division point closest to the break point and intervals between adjacent division points on the line segment are all equal to the second interval, the coefficients for the primary expressions representing the approximate line segments being calculated based on the calculated coordinates of the division points.

5. The digital gamma correction circuit according to claim 4, wherein the coefficient calculation portion includes:

a first division point coordinate calculation portion for calculating the coordinates of the division points on the one of the two line segments based on the coordinates of each break point and the first interval set by the data setting portion;

an interval calculation portion for calculating the second interval based on the coordinates of each break point and the first interval set by the data setting portion, such that the distances from each break point on the one of the two line segments to the division point closest to the break point and the distances from each break point on the other of the two line segments to the division point closest to the break point are approximately equal;

a second division point coordinate calculation portion for calculating the coordinates of the division points on the other of the two line segments based on the second interval calculated by the interval calculation portion and the coordinates of the division points set by the data setting portion;

a slope/intercept calculation portion for calculating slopes and intercepts of the approximate line segments as the coefficients for the primary expressions based on the coordinates of the division points calculated by the first and second division point coordinate calculation portions; and a slope/intercept selection portion for selecting coefficients corresponding to the input image data from among the coefficients calculated by the slope/intercept calculation portion and providing the selected coefficients to the arithmetic portions.

6. A digital gamma correction method for performing gamma correction on input image data by defining a gamma correction broken line approximating an ideal gamma correction curve, the method comprising:

a data setting step for setting set values for defining the gamma correction broken line, the set values representing a broken baseline including one or more break points and (N−1) approximate line segments provided for each break point and having their respective slopes obtained by dividing a difference in slope between two line segments adjacent at the break point included in the broken baseline into N, N being an integer of 2 or more;

a coefficient calculation step for calculating coefficients for primary expressions representing the approximate line segments based on the set values set in the data setting step;

(N−1) arithmetic steps for calculating (N−1) output candidate values as candidates for an output value that is obtained by subjecting the input image data to the gamma correction, based on, among the coefficients calculated by the coefficient calculation step, coefficients for (N−1) primary expressions representing (N−1) approximate line segments at a break point corresponding to a value of the input image data; and a result selection step for selecting an output candidate value corresponding to the gamma correction broken line from among the (N−1) output candidate values calculated by the arithmetic steps, and setting the selected output candidate value as the output value that is obtained by subjecting the input image data to the gamma correction.

7. The digital gamma correction method according to claim 6, wherein in the result selection step, when the broken baseline is convex upward at the break point corresponding to the value of the input image data, a minimum value is selected from among the (N−1) output candidate values calculated by the arithmetic steps, whereas when the broken baseline is convex downward at the break point corresponding to the value of the input image data, a maximum value is selected from among the (N−1) output candidate values calculated by the arithmetic steps, the selected output candidate value being set as the output value that is obtained by subjecting the input image data to the gamma correction.

8. The digital gamma correction method according to claim 7, wherein in the data setting step, set values are set for representing the broken baseline and the (N−1) approximate line segments provided for each break point and having their respective slopes, the (N−1) approximate line segments being obtained by sequentially connecting a division point, which is selected in decreasing order of distance to the break point from among (N−1) division points set on one of the two line segments adjacent at the break point included in the broken baseline, to a division point, which is selected in increasing order of distance to the break point from among (N−1) division points set on the other of the two line segments.

9. A program for causing a computer to execute a digital gamma correction method claimed in claim 8.

10. A program for causing a computer to execute a digital gamma correction method claimed in claim 7.

11. A program for causing a computer to execute a digital gamma correction method claimed in claim 6.

12. A non-transitory computer-readable storage medium storing a program for generating data for defining a gamma correction broken line approximating an ideal gamma correction curve, the program causing a computer to execute:

a data setting step for setting set values for defining the gamma correction broken line, the set values being intended to provide a broken baseline including one or more break points and (N−1) approximate line segments provided for each break point, N being an integer of 2 or more;

a coefficient calculation step for calculating coefficients for primary expressions representing the (N−1) approximate line segments provided for each break point, based on the set values set in the data setting step, the (N−1) approximate line segments being obtained by sequentially connecting a division point, which is selected in decreasing order of distance to the break point from among (N−1) division points set on one of the two line segments adjacent at the break point included in the broken baseline, to a division point, which is selected in increasing order of distance to the break point from among (N−1) division points set on the other of the two line segments.

13. The non-transitory computer-readable storage medium according to claim 12, wherein in the data setting step, coordinates of each break point and a first predetermined interval are set, and wherein the coefficient calculation step includes the steps of:

based on the coordinates of each break point and the first interval set in the data setting step, calculating coordinates of the (N−1) division points on the one of the two line segments, such that distances from each break point on the one of the two line segments to a division point closest to the break point and intervals between adjacent division points on the line segment are all equal to the first interval;

based on a second interval calculated based on the first interval set in the data setting step, calculating coordinates of the (N−1) division points on the other of the two line segments, such that distances from each break point on the other of the two line segments to a division point closest to the break point and intervals between adjacent division points on the line segment are all equal to the second interval; and calculating the coefficients for the primary expressions representing the approximate line segments based on the calculated coordinates of the division points.

14. A gamma correction data generation method for generating data for defining a gamma correction broken line approximating an ideal gamma correction curve, the method comprising:

a data setting step for setting set values for defining the gamma correction broken line, the set values being intended to provide a broken baseline including one or more break points and (N−1) approximate line segments provided for each break point, N being an integer of 2 or more;

a coefficient calculation step for calculating coefficients for primary expressions representing the (N−1) approximate line segments provided for each break point, based on the set values set in the data setting step, the (N−1) approximate line segments being obtained by sequentially connecting a division point, which is selected in decreasing order of distance to the break point from among (N−1) division points set on one of the two line segments adjacent at the break point included in the broken baseline, to a division point, which is selected in increasing order of distance to the break point from among (N−1) division points set on the other of the two line segments.

15. The gamma correction data generation method according to claim 14, wherein in the data setting step, coordinates of each break point and a first predetermined interval are set, and wherein the coefficient calculation step includes the steps of:

based on the coordinates of each break point and the first interval set in the data setting step, calculating coordinates of the (N−1) division points on the one of the two line segments, such that distances from each break point on the one of the two line segments to a division point closest to the break point and intervals between adjacent division points on the line segment are all equal to the first interval;

based on a second interval calculated based on the first interval set in the data setting step, calculating coordinates of the (N−1) division points on the other of the two line segments, such that distances from each break point on the other of the two line segments to a division point closest to the break point and intervals between adjacent division points on the line segment are all equal to the second interval; and calculating the coefficients for the primary expressions representing the approximate line segments based on the calculated coordinates of the division points.

16. A gamma correction data generation device for generating data for defining a gamma correction broken line approximating an ideal gamma correction curve, the device comprising:

a data setting portion for setting set values for defining the gamma correction broken line, the set values being intended to provide a broken baseline including one or more break points and (N−1) approximate line segments provided for each break point, N being an integer of 2 or more; and a coefficient calculation portion for calculating coefficients for primary expressions representing the (N−1) approximate line segments provided for each break point, based on the set values set by the data setting portion, the (N−1) approximate line segments being obtained by sequentially connecting a division point, which is selected in decreasing order of distance to the break point from among (N−1) division points set on one of the two line segments adjacent at the break point included in the broken baseline, to a division point, which is selected in increasing order of distance to the break point from among (N−1) division points set on the other of the two line segments.

17. The gamma correction data generation device according to claim 16, wherein the data setting portion sets coordinates of each break point and a first predetermined interval, and wherein based on the coordinates of each break point and the first interval set by the data setting portion, the coefficient calculation portion calculates coordinates of the (N−1) division points on the one of the two line segments, such that distances from each break point on the one of the two line segments to a division point closest to the break point and intervals between adjacent division points on the line segment are all equal to the first interval, and based on a second interval calculated based on the first interval set by the data setting portion and the coordinates of each break point, the coefficient calculation portion calculates coordinates of the (N−1) division points on the other of the two line segments, such that distances from each break point on the other of the two line segments to a division point closest to the break point and intervals between adjacent division points on the line segment are all equal to the second interval, the coefficients for the primary expressions representing the approximate line segments being calculated based on the calculated coordinates of the division points.

* * * * *